Nov. 17, 1936.  J. DE NICOLA  2,060,857
THERMOSTATIC VALVE
Filed June 1, 1936  2 Sheets-Sheet 1

JOHN DE NICOLA.
INVENTOR

BY W. H. Young
ATTORNEY

Nov. 17, 1936.   J. DE NICOLA   2,060,857
THERMOSTATIC VALVE
Filed June 1, 1936   2 Sheets-Sheet 2
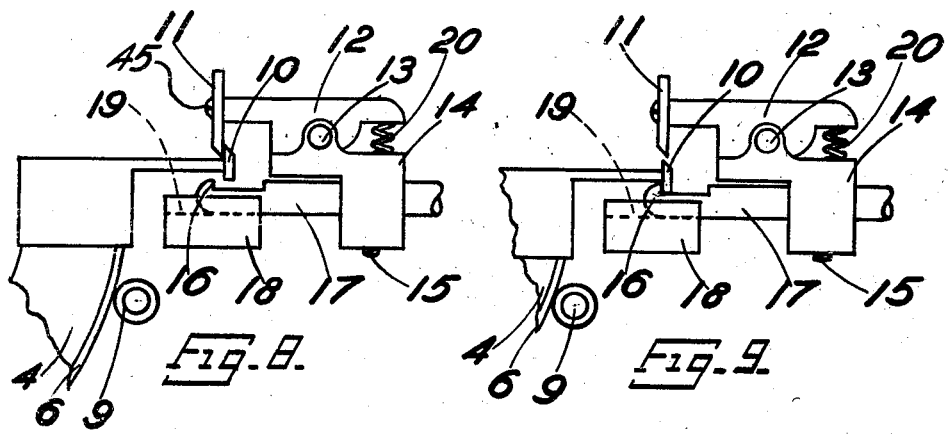
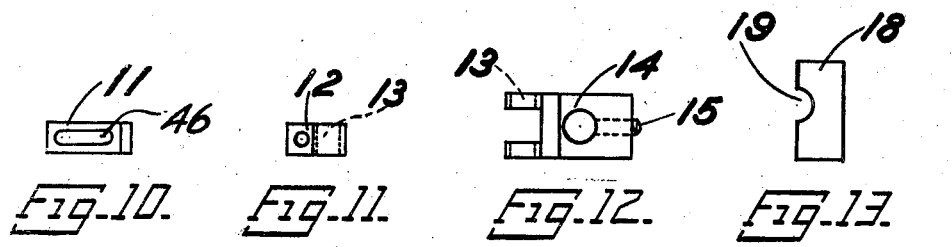
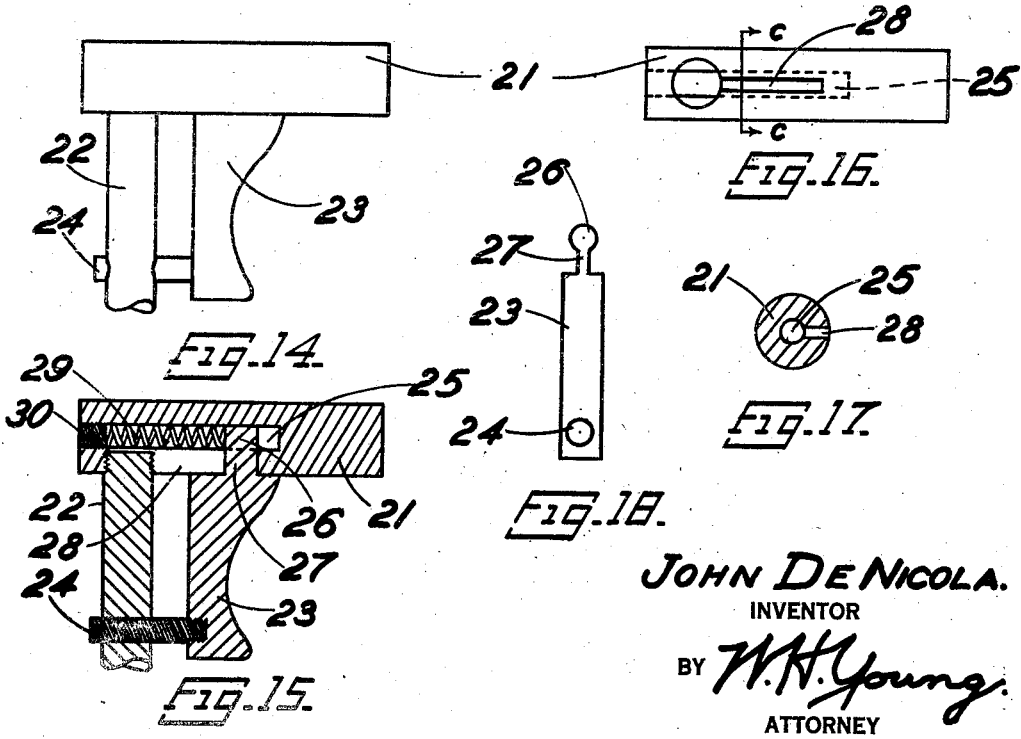
JOHN DE NICOLA.
INVENTOR
BY W. H. Young
ATTORNEY Patented Nov. 17, 1936

2,060,857

UNITED STATES PATENT OFFICE 2,060,857

THERMOSTATIC VALVE

John De Nicola, Paterson, N. J.

Application June 1, 1936, Serial No. 82,684

7 Claims. (Cl. 137—139)

My application relates generally to automatic shut-off valves employed in fuel lines and actuated by a thermostatic element controlled by the heat from the burning fuel. More particularly the device hereinafter disclosed is illustrated in conjunction with a domestic gas range burner Its purpose is to shut-off the fuel supply in case the flame should be extinguished accidently, which under ordinary conditions would permit the unburned gas to escape.

In combination with the general device a novel, manually operated supply valve is employed for the purpose of turning on the gas and setting the thermostatic device in its normal operating position at the same time. The thermal ring is made of a refractory clay for improving the action and providing longer life than ordinary metallic elements. A novel latching mechanism is employed for the purpose of automatically holding the shut-off valve open during the interval between the time the gas is lighted until the thermal element is heated sufficiently to control the shut-off valve directly. By the latter feature it is unnecessary to manually hold the shut-off valve open immediately after lighting the burner as is the usual practice in similar devices. Further objects and advantages will be hereinafter disclosed.

I attain these objects by the mechanism illustrated in the accompanying drawings, in which.

Figure 1:
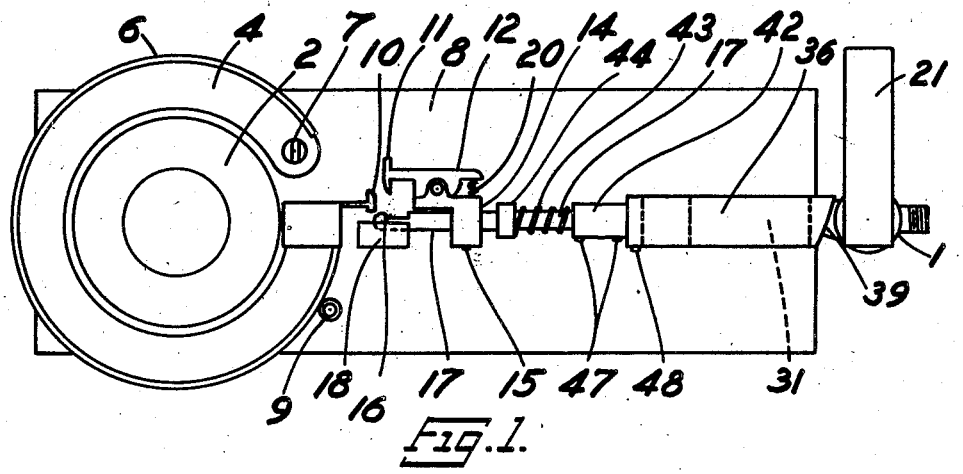
Fig. 1 is a plan and Figure 2 is a front elevation of the complete device.

Figs. 8 to 13 inclusive are enlarged illustrations of which Figs. 8 and 9 are plan views of the complete latching mechanism; Figs. 10, 11, 12 and 13 are side elevations of the cold catch, cold catch pivoted arm, coupling, and the guide block respectively.

Fig. 14 is a side elevation of the complete supply valve handle incorporating means for setting the latching mechanism into operating position; Fig. 15 is a similar view in section. Fig. 16 is a plan of the under side of the handle or grip; Fig. 17 is a section on CC of Fig. 16, and Fig. 18 is a side elevation of the trigger and pin.

The complete invention comprises three mechanisms in combination, namely the thermostatic device, the latching mechanism connected to the shut-off valve, and the supply valve incorporating means for setting the latching mechanism.

The thermostatic device includes a thermostatic element 4 in the form of an open ring and made preferably of a refractory clay and mounted on a metal base 6. The thermostat is fastened at one end to the base 8 by screw 7. The keeper 10 is fixed to the free end of the thermal element 4 and is actuated by the movement of the said element caused by variations in temperature. Said keeper 10 has the general shape of a hammer wherein the handle is attached to the thermostatic element 4 and the head, comprised of two oppositely disposed arms, one beveled at the end and one square, for engagement with the cold and hot catches respectively as hereinafter explained. A guide roller 9 is provided to confine the motion of the element 4 and keeper 10 in a direction approximately at right angles to valve rod 17, or, in other words tangential to the circular thermal element 4.

The latching device illustrated particularly in Figs. 8 and 9 includes a cold catch 11 which is adjustably fastened to the pivoted arm 12 by means of screw 46 inserted through slot 46. The term "cold" as applied to catch 11 is merely used to indicate the catch which operates to hold the shut-off valve open during the period before the thermostat is heated as distinguished from the hot catch employed thereafter. The arm 12 is pivoted at point 13 to coupling 14 which in turn is adjustably fastened to the valve rod 17 by set screw 15. By reference to Figs. 8 and 9 it will be seen that any longitudinal movement of valve rod 17 will move both the cold catch 11 and hot catch 16 formed in the end of the valve rod, at the same time. In Fig. 8 the beveled arm of keeper 10 is shown in engagement with cold catch 11. In this position the valve rod 17 has been moved to the left, during the operation of turning on the gas and depressing the trigger 23 as hereinafter explained; Fig. 1 shows the device in a closed position before turning on the gas and lighting the burner. During the operation of turning on the gas and setting the latching mechanism the adjacent beveled edges of keeper 10 and catch 11 respectively slide upon each other causing the catch 11 to swing outward on its arm 12 about pivot 13 until the catch 11 under the force of spring 20 drops behind and into engagement with the beveled arm of keeper 10 (Fig. 8).

As the thermal element 4 expands from the heat, the keeper 10 is drawn, approximately at right angles, away from the cold catch 11 and into position for engagement with the hot catch 16. When the expansion of the thermostat is sufficient, the keeper 10 (Fig. 8) will release the cold catch 11; the latching mechanism including both the cold and hot catches attached to the valve rod 17 then move in unison to the right under the tension of valve spring 43; this movement is short and continues until the square arm of keeper 10 engages with hot catch 16 as illustrated in Fig. 9. As long as the gas continues to burn and the thermostatic element 4 remains expanded the latching mechanism will be positioned as shown in Fig. 9. To prevent distortion of the valve rod 17 and catch 16 from an excessive pull on the keeper 10 due to over expansion of the thermal element, the guide block 18 provided with groove 19 is employed in which the valve rod 17 slides. When the flame is extinguished, the thermal element 4 contracts; when the contraction is sufficient the square arm of keeper 10 will be disengaged from the hot catch 16 thereby allowing the latching mechanism to return to its extreme right hand position as illustrated in Fig. 1.

Figure 2:
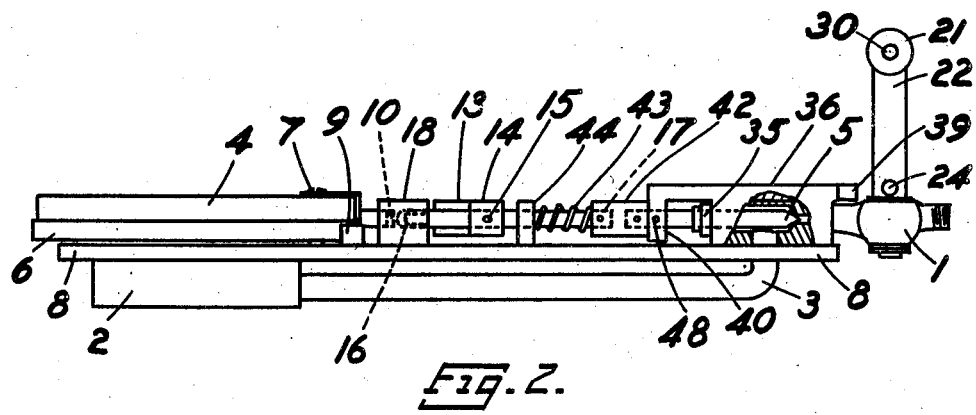
Figure 3:
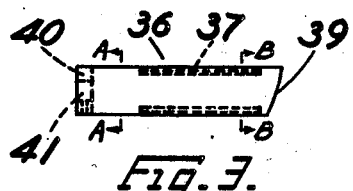
Fig. 3 is a plan of the cross-head.
Figure 4:
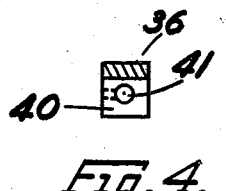
Figs. 4 and 5 are side elevations in section on lines AA and BB respectively of Fig. 3.
Figure 5:
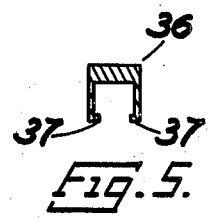
Figure 6:
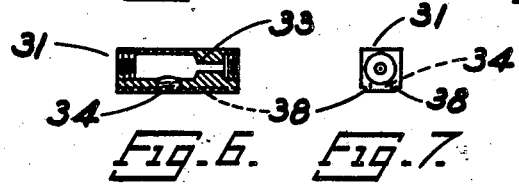
Fig. 6 is a front section and Fig. 7 a side elevation of the shut-off valve chest.
Figure 7:
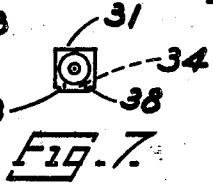

The valve rod 17 and shut-off valve 5 are circular in cross-section and adjustably connected by coupling 42 (Fig. 2); two set screws 47 are provided to permit adjustments in length and position. The cross-head 36 is provided with a lip 40 having a hole 41 into which the stem of the valve 5 fits and is secured against rotation by set screw 48. The valve spring 43 is located on the valve rod between the bracket 44, which is attached to the base 8, and the coupling 42. The cross-head 36 is provided with guides 37 which are adapted to fit grooves 38 of the valve chest and slide therein.

At the outer end of the cross-head a cam shaped projection 39 is provided against which the pin 24 operates when the supply valve is turned on and the trigger 23 depressed for setting the latching mechanism and keeper into engagement. The supply valve is illustrated in detail in Figs. 14 to 18 inclusive; a grip 21 is provided with a longitudinal hole 25 and slot 26 in which the knob 26 and the reduced portion 27 respectively of trigger 23 are retained and guided. When the trigger 23 is pressed forward the pin 24 slides thru the transverse hole in the stem 22 and engages with cam 39 of cross-head 36. The trigger 23 and pin 24 are depressed by pressure from the fingers of the hand operating the supply valve; a spring 29 is provided between plug 30 and knob 26 to return the trigger and pin to their normal position.

The mechanism is operated by turning the supply valve handle 21 and at the same time depressing the trigger 23 and pin 24. The pin 24 slides along the cam 39 forcing the cross-head 36 toward the burner; the cross-head, being fastened to the valve rod, moves the latching mechanism into engagement with the thermostatic keeper 10 as illustrated in Fig. 8, at the same time the shut-off valve 5 is moved off its seat. The burner is then lit causing the thermostat to expand until the keeper 10 is moved out of engagement with the hot catch 16. Thereafter whether the fuel supply is cut off by closing the supply valve 1 or whether the flame is extinguished in any other manner, the thermostat will contract and disengage the keeper 10 and hot catch 16 thereby allowing the shut-off valve 5 to snap closed under the tension of spring 43.

I claim:

1. A device of the type described comprising a thermostatic element, a keeper attached to said element, a latching mechanism adapted to engage with said keeper and including a valve rod and hot catch formed in the end of said valve rod, and a cold catch pivotally mounted on said valve rod, a shut-off valve connected to said latching mechanism, and a supply valve in combination with means for setting the latching mechanism and keeper into operating engagement.

2. A device of the type described comprising a thermostatic element, a hammer shaped keeper attached to said element provided with a square arm and a beveled arm, a latching mechanism including a valve rod, a hot catch formed in the end of said rod and adapted to engage with the square arm of said keeper, a cold catch pivotally mounted on said valve rod and adapted to engage with the beveled arm of said keeper, a shut-off valve connected to said latching mechanism, and a supply valve in combination with means for setting the latching mechanism and keeper into operating engagement.

3. A device of the type described comprising a thermostatic element, a keeper attached to said element provided with a square arm and a beveled arm, a latching mechanism including a valve rod, a hot catch formed in the end of said rod and adapted to engage with the square arm of said keeper, a cold catch pivotally mounted on said valve rod and adapted to engage with the beveled arm of said keeper, a guide block for preventing distortion of said valve rod and hot catch, a shut-off valve connected to said latching mechanism, and a supply valve in combination with means for setting the latching mechanism and keeper into operating engagement.

4. A device of the type described comprising a thermostatic element, a keeper attached to said element, a latching mechanism adapted to engage with said keeper, a shut-off valve connected to said latching mechanism, a cross-head attached at one end to said shut-off valve and having the opposite end formed into a cam, and a supply valve in combination with means for setting the latching mechanism and keeper into operating engagement and comprising a hollow grip attached to the supply valve stem, a transverse hole in said stem, a trigger slidably held by said hollow grip, a pin attached to said trigger and adapted to slide in the said transverse hole in the valve stem and engage with said cross-head cam when the trigger is pressed forward and the grip rotated on its stem.

5. A latching mechanism comprising a hammer shaped keeper with one beveled and one square arm, a valve rod, a cold catch adjustably mounted on an arm pivotably attached to the valve rod and adapted to engage with the beveled arm of said keeper, and a hot catch formed in the end of said rod and adapted to engage with the square arm of said keeper after the cold catch has become disengaged therefrom.

6. A supply valve in combination with means for setting a latching mechanism and keeper into operating engagement and comprising a cam, a hollow grip attached to a valve stem, a transverse hole in said stem, a trigger slidably held by said hollow grip, and a pin attached to said trigger and adapted to slide in said transverse hole in the valve stem and operatively engage with said cam.

7. A device of the type described comprising a thermostat, a latching mechanism including a hammer shaped keeper attached to said thermostat, said keeper having one square and one beveled arm, a shut-off valve, a valve rod connected to said shut-off valve, a hot catch formed in the end of said rod for engagement with the square arm of said keeper, a cold catch adjustably mounted on an arm pivotably attached to said valve rod and adapted to engage with the beveled arm of said keeper, and a supply valve in combination with means for setting the latching mechanism and keeper into operating engagement and including a cross-head attached at one end to said shut-off valve and provided with a cam at the opposite end, a hollow grip attached to the supply valve stem, a transverse hole in said stem, a trigger slidably held by said hollow grip, and a pin attached to said trigger and adapted to slide in said transverse hole and operatively engage with said cam.

JOHN DE NICOLA.